March 29, 1949.   B. F. ARPS   2,465,831
SCOOP ATTACHMENT FOR TRACTORS
Filed Oct. 23, 1947   3 Sheets-Sheet 1

INVENTOR.
BRUNO F. ARPS
BY A.S.Krotz
ATTORNEY

March 29, 1949.  B. F. ARPS  2,465,831
SCOOP ATTACHMENT FOR TRACTORS

Filed Oct. 23, 1947  3 Sheets-Sheet 2

INVENTOR.
BRUNO F. ARPS
BY  A.S.Kroh
ATTORNEY

March 29, 1949.  B. F. ARPS  2,465,831

SCOOP ATTACHMENT FOR TRACTORS

Filed Oct. 23, 1947  3 Sheets-Sheet 3

INVENTOR.
BRUNO F. ARPS
BY
ATTORNEY

Patented Mar. 29, 1949

2,465,831

UNITED STATES PATENT OFFICE 2,465,831

SCOOP ATTACHMENT FOR TRACTORS

Bruno F. Arps, New Holstein, Wis., assignor to Arps Corporation, New Holstein, Wis., a corporation of Wisconsin Application October 23, 1947, Serial No. 781,695

2 Claims. (Cl. 37—126)

The present invention relates to a dump scoop attachment for tractors having preferably a hydraulic lift for which to raise and lower the scoop.

Objects of the present invention are to provide a scoop which can be quickly attached and detached, which is simple and easy to operate, durable and can be manufactured at low cost.

An object of my invention is to provide a scoop having an improved dumping mechanism which makes the scoop more stable and provides more convenient and effective means for manually dumping and returning the scoop to an operating position.

Another object is to provide a scoop attachment which will retain the scoop at substantially all load carrying positions in a generally backward tilting position whereby the retaining of the load is facilitated.

A further object of the present invention is to add to the work capacity per day by making the operations more convenient for the operator of the tractor and thereby add to the value of the toggle-like attachment.

To these and other useful ends my invention consists of parts, combinations of parts or their equivalents and mode of operation as hereinafter described and claimed and shown in the accompanying drawings in which:

Figure 1:
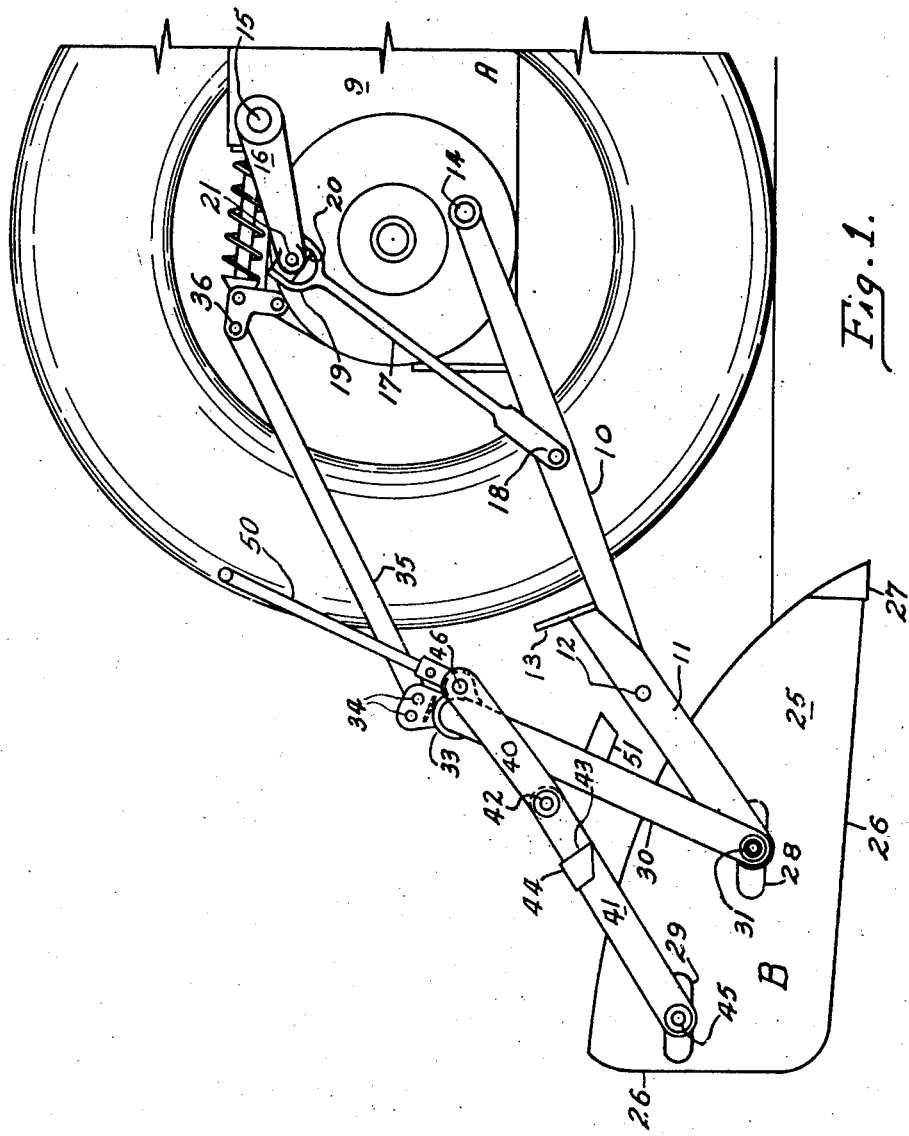
Fig. 1 is a side elevational view of my scoop, shown as attached to a conventional tractor and in its operating or loading position.
Figure 2:
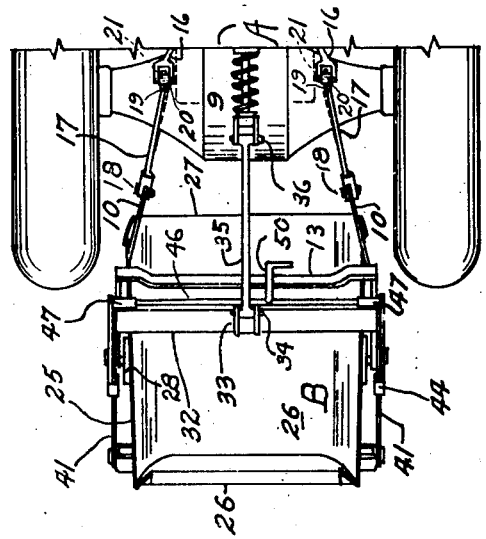
Fig. 2 is a top view of the device as shown in Figure 1.

In the drawings reference character A designates the tractor, reference character B designates the scoop. The dumping mechanism and connections to the tractor are clearly shown in the various figures wherein the draw bars comprise front and rear members 10—10 and 11—11, these members being hingedly connected together as at 12—12. Members 11 have a cross bar 13 which is adapted to limit the down movement of hinge 12 by resting on member 10 and to stiffen the structure. Members 10 at their front ends are hingedly connected to the frame 9 of the tractor and to opposite sides of the frame as at 14—14. The hydraulic power lift of the tractor (not shown) is preferably positioned within frame 9 and having a shaft 15 which protrudes on opposite sides of the frame, each protruding end having levers 16—16 secured thereto. Links 17—17 at their lower ends are hingedly connected to members 10 as at 18—18 and being preferably forked at their upper ends as at 19—19 the forks being each hinged to blocks 20—20 the blocks being hinged to the forked ends of levers 16 as at 21—21. Scoop B comprises side plates 25—25 their bottoms and rear ends being connected by means of plate 26, this plate being preferably formed in one piece and welded to the bottoms and rear ends of plates 25.

On the forward end of member B I secure a cutting blade 27; thus member B is complete except on plates 25, I provide stiffening members 28 and 29. Side bars 30—30 are preferably pivoted to members 28 as at 31 and secured together at their upper ends by means preferably of a tube 32 forming a frame, the upper side of the tube having a bracket 33 with two or more spaced apart holes 34 to which a push bar 35 is pivotally secured, the push bar extending forwardly and being hinged to tractor 9 in any convenient manner as at 36.

Figure 1 illustrates the scoop when in an operating position and at this time members 10 and 11 are extended to full length. When the power lift first begins to raise members 10 these members and members 11 will assume the position shown in Figure 3, thus shortening the space between pivots 14 and 31 resulting in raising the front end of the scoop or tilting the scoop back as shown. The objects of this movement are two-fold.

First before the power lift is required to lift the major weight of the scoop, its front end is lifted so as to tear the material or sod loose; second to retain all of the material on the scoop by tilting it back, without a change in the dumping mechanism. The dumping mechanism comprises trip bars 40—40 on opposite sides of the scoop and which are hinged to corresponding bars 41—41 as at 42 to provide toggle-like tilt control members.

Each bar 40 terminates as at 43 and has secured thereto hook over members 44 which lay on members 41, for a purpose which will hereinafter appear. Members 41 at their rear ends are pivoted to members 29 as at 45. The forward ends of members 40 have secured thereto a shaft 46 which is rotatably mounted in lugs 47—47 secured to tube 32. Thus members 40 at their rear ends may swing upward on shaft 46 as an axis and members 41 may swing upward on pivots 45 as axes. When members 44 rest on members 41, pivot 42 therebetween will be slightly below a plane containing the axes of members 45 and 46. Thus the scoop will be held in the position shown in Figures 1, 3 and 4 and all of the dirt will be retained on the scoop when the scoop is raised for transporting.

I secure an L shaped rod 50 to shaft 46 in about the position shown in Figures 1, 2, 3 and 4 when the bars 40—40 and 41—41 are extended. When it is desired to dump the scoop the operator of the tractor reaches back and pulls on the free end of member 50, so as to raise pivots 42 thereby releasing the bars 40—40 and 41—41 from dead center interlock, after which time the scoop is free to assume the position shown in Figure 5 and remain in this position until it is desired to move the scoop to the position shown in Figure 1. Generally this is automatically accomplished after the operator moves the free end of member 50 upward a short distance. If the toggle-like members 40—40, 41—41 are not fully locked automatically as shown in Figure 1 after the scoop is lowered for operation this is accomplished by pushing rearward on the free end of member 50.

Both sides of the scoop at its rear end are held definitely in position by the bars 40—40, 41—41 so the rear end of the scoop can not sag at one side or the other, either because of the load in the scoop or because of an excessive pull against one end of the blade 27 while loading the scoop.

Figure 3:
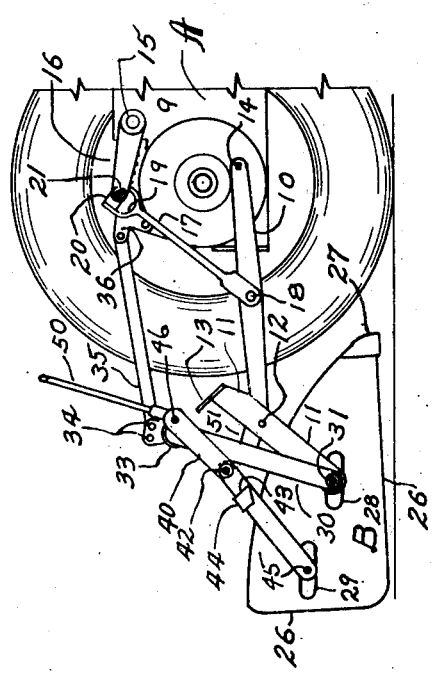
Fig. 3 is a view similar to Figure 1 except showing the position of the scoop directly after the lifting mechanism begins to operate.
Figure 4:
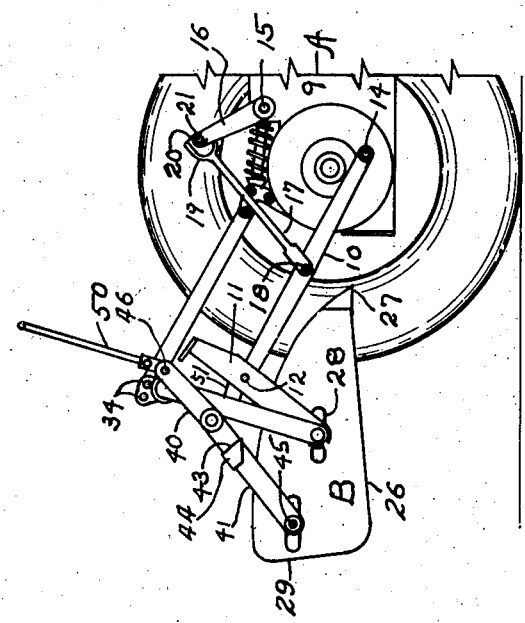
Fig. 4 is a view similar to Figure 1 illustrating the scoop in a lifted position for transporting the material.
Figure 5:
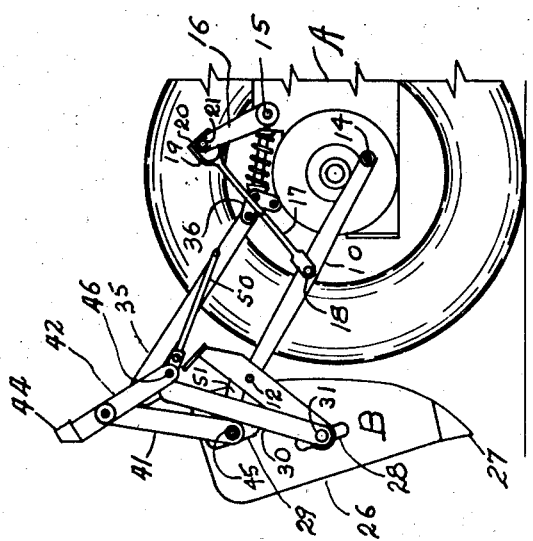
Fig. 5 is a view similar to Figure 4 but after the scoop has been dumped.

In the construction illustrated the position of the scoop during lifting and carrying is controlled by a stop 51 disposed between each member 11 and the corresponding member 30 whereby a predetermined initial lifting of the front end of the scoop is obtained followed by a maintained positioning of the scoop at all carrying levels, as shown in Figs. 3 and 4. In this maintained carrying position the scoop is tilted backward a small amount to more readily retain its load.

Because of the positioning of stops 51 between members 11 and 30 and the pivoting of members 11 and 30 to the scoop through a single bracket 28, and also because the thrust toggle members 40—41 are arranged in pairs on opposite sides of the scoop and members 41 are pivoted to the scoop at side brackets 29, the scoop load is carried by a substantially rigid frame work in which the scoop is hung and substantially free from torsional and concentrated stresses.

It will be understood that minor detail changes may be made without departing from the spirit and scope of my invention as recited in the appended claims, for example the positions of pivots 31 and 45 may be somewhat differently located.

Having thus shown and described my invention, I claim:

1. A dump scoop attachment of the class described, comprising a scoop having a pair of side walls, a bottom carrying a forward cutting edge between the side walls, and a rear wall, a pair of draw bars normally extending forwardly from the scoop and having their rear ends pivoted to the corresponding opposite sides of the scoop near the center of the latter, each said draw bar comprising a pair of toggle-like arms hinged to each other and having interengaging abutment means disposed to prevent relative downward pivotal movement of the arms when in a substantially extended position, an upper arm extending substantially parallel to the forward arms of said draw bars, means disposed to connect the rear end of said upper arm to the rear end of the scoop connecting links disposed to additionally connect the rear end of said upper arm to the sides of the scoop and comprising a pair of links pivoted to the corresponding sides of the scoop at points substantially coinciding with the pivotal connections between the corresponding draw bars and the scoop, means to lift the forward arms of said draw bars to constitute the same as lift bars for the scoop and effect a raising of the hinged toggle joints between the forward and rear arms of the draw bars, and stop means between the rear arms of said draw bars and said connecting links disposed to limit relative movement therebetween upon raising of said toggle joints of the draw bars to thereby limit the backward tilt of the scoop, whereby the scoop may be carried at any operative level in a backward tilted position to retain material therein.

2. A dump scoop attachment of the class described, comprising a scoop having a pair of side walls, a bottom carrying a forward cutting edge between the side walls, and a rear wall, a pair of draw bars normally extending forwardly from the scoop and having their rear ends pivoted to the corresponding opposite sides of the scoop near the center of the latter, each said draw bar comprising a pair of toggle-like arms hinged to each other and having interengaging abutment means disposed to prevent relative downward pivotal movement of the arms when in a substantially extended position, an upper arm extending substantially parallel to the forward arms of said draw bars, a trip hinged toggle-like connecting means disposed between the rear end of said upper arm and each side of the scoop with the lower sections thereof pivoted to the scoop sides rearwardly of the corresponding draw bar pivot to the scoop side, means disposed to rigidly connect the upper sections of said connecting means across the top of the scoop including means disposed to trip the same for dumping the scoop forwardly, connecting links disposed to additionally connect the rear end of said upper arm to the sides of the scoop and comprising a pair of links pivoted to the corresponding sides of the scoop at points substantially coinciding with the pivotal connections between the corresponding draw bars and the scoop, means to lift the forward arms of said draw bars to constitute the same as lift bars for the scoop and effect a raising of the hinged toggle joints between the forward and rear arms of the draw bars, and stop means between the rear arms of said draw bars and said connecting links disposed to limit relative movement therebetween upon raising of said toggle joints of the draw bars to thereby limit the backward tilt of the scoop, whereby the scoop may be carried at any operative level in a backward tilted position to retain material therein and with the forces exerted by the lift bars and the upper arm transmitted directly to the connecting means and connecting links and from these to the opposite sides of the scoop.

BRUNO F. ARPS.

REFERENCES CITED

The following references are of record in the file of this patent:

UNITED STATES PATENTS

| Number | Name | Date |
|---|---|---|
| 196,143 | Edmundson | Oct. 16, 1877 |
| 2,273,875 | Livesey et al. | Feb. 24, 1942 |
| 2,352,466 | Arps | June 27, 1944 |
| 2,364,121 | Arps | Dec. 5, 1944 |
| 2,398,991 | Arps | Apr. 23, 1946 |